United States Patent [19]
Orii et al.

[11] Patent Number: 5,112,571
[45] Date of Patent: May 12, 1992

[54] FUEL ASSEMBLY AND FUEL SPACER

[75] Inventors: Akihito Orii, Hitachi; Osamu Yokomizo, Ibaraki; Yasuhiro Masuhara, Katsuta; Koji Nishida, Hitachi; Shigeto Murata, Katsuta; Shin-ichi Kashiwai, Hitachi; Kotaro Inoue, Ibaraki; Yuichiro Yoshimoto, Hitachi, all of Japan

[73] Assignee: Hitachi, Ltd., Tokyo, Japan

[21] Appl. No.: 510,192

[22] Filed: Apr. 17, 1990

[30] Foreign Application Priority Data
Apr. 26, 1989 [JP] Japan .................. 1-106589

[51] Int. Cl.⁵ .................................. G21C 3/34
[52] U.S. Cl. ............................ 376/439; 376/443
[58] Field of Search ........................ 376/439, 443

[56] References Cited

U.S. PATENT DOCUMENTS

| | | | |
|---|---|---|---|
| 3,228,853 | 1/1966 | Ritz | 376/439 |
| 3,886,038 | 5/1975 | Raven | 376/439 |
| 3,933,584 | 1/1976 | Litt | 376/439 |
| 4,913,875 | 4/1990 | Johansson | 376/439 |

FOREIGN PATENT DOCUMENTS

| | | | |
|---|---|---|---|
| 0260601 | 3/1988 | European Pat. Off. | 326/439 |
| 0260602 | 3/1988 | European Pat. Off. | 376/439 |
| 0304724 | 3/1989 | European Pat. Off. | 376/439 |
| 1439362 | 4/1969 | Fed. Rep. of Germany | 376/439 |
| 2602487 | 4/1985 | Fed. Rep. of Germany | 376/439 |

Primary Examiner—Donald P. Walsh
Attorney, Agent, or Firm—Antonelli, Terry Stout & Kraus

[57] ABSTRACT

In a fuel assembly having fuel rods inserted into regularly arranged cells of a fuel spacer which keeps the fuel rods correctly spaced from one another and has spacer elements disposed in a plurality of stages in the longitudinal direction of the fuel rods, the fuel spacer comprises vanes formed on the cells in such a manner that each vane is bent from a cut formed in a part of the side wall of the cell. The vanes obliquely project into the corresponding spaces between adjacent fuel rods and allow a coolant flowing through the spaces and forming two-phase flows to generate swirling flows toward the fuel rods. The fuel spacer may alternatively comprise either thin-walled cylinders having built-in vanes or spiral vanes, which are fixed to the spacer that has not been subjected to any direct machining. Also disclosed is a fuel assembly provided with any of the above-described fuel spacers. The arrangement of the present invention enables, while assuring a sufficient strength for maintaining fuel rods in their correct position, the transfer of heat from the fuel rods to the coolant to be promoted so as to raise the allowable power level of the fuel assembly, and enables the void ratio to be lowered so as to increase the reactivity.

13 Claims, 7 Drawing Sheets

FIG. 9
FIG. 10
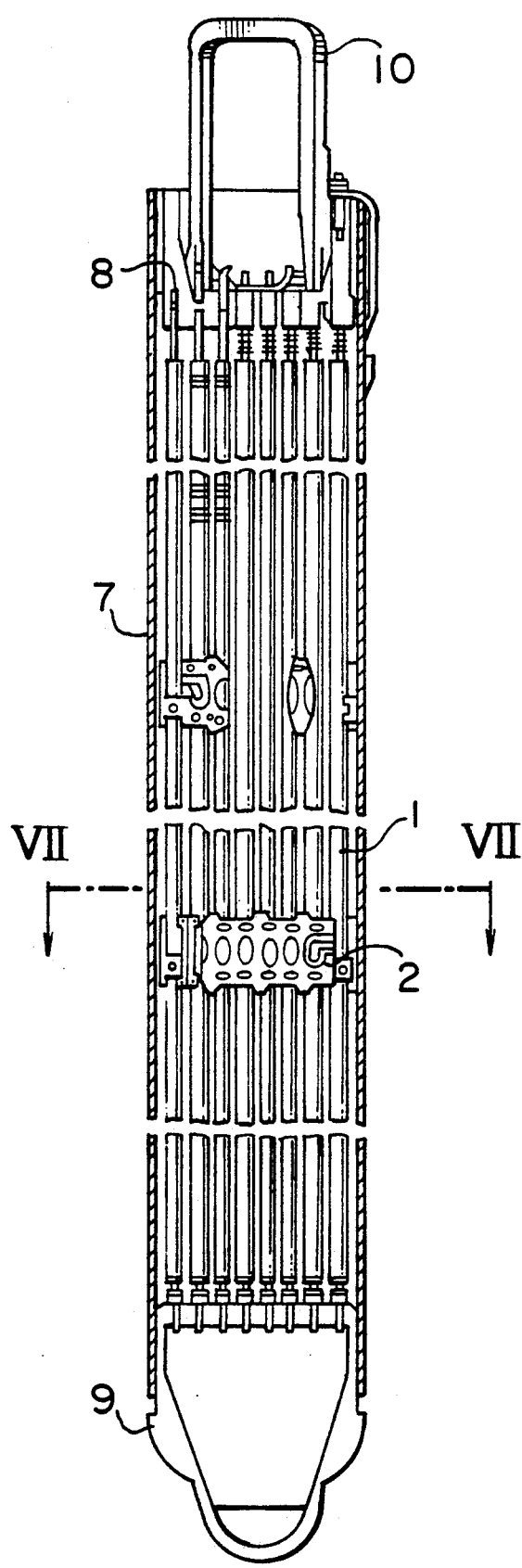
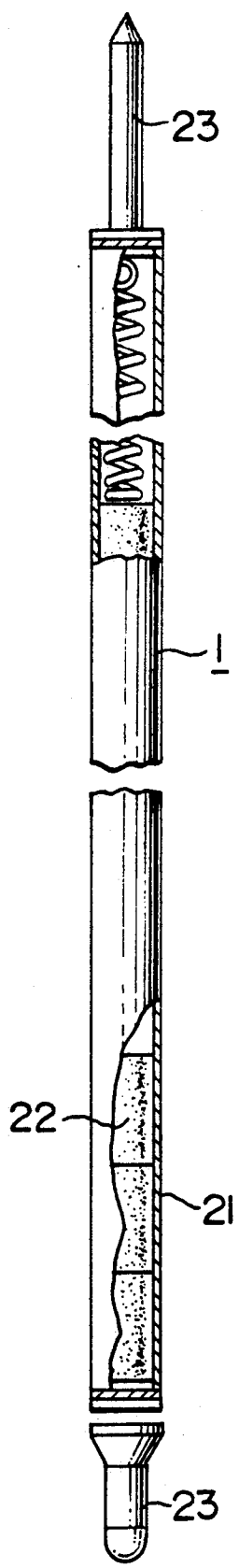

FUEL ASSEMBLY AND FUEL SPACER

BACKGROUND OF THE INVENTION

The present invention relates to a fuel assembly and a fuel spacer and, more particularly, to the structure of a fuel assembly and a fuel spacer that is capable of promoting heat transfer from the fuel rods serving as the heat source to the coolant so as to raise the allowable power level of the fuel assembly, and also capable of lowering the void ratio so as to increase the reactivity.

Spacer structures directed to improvement in the heat transfer efficiency of the fuel assembly in a pressurized water reactor (PWR) are known from, for example, Japanese Patent Application No. 42-32372 corresponding to U.S. Pat. No. 3,395,077 and No. 3,379,619. In this example, the structure is such that, in the center of four sides surrounding fuel rods, a grating-type spacer and an obstacle serving as a vane are provided.

In this structure, a coolant flows over the peripheries of the fuel rods in such a manner as to cover them in accordance with the configuration of the vane and the position at which it is mounted. When a coolant flows in a fuel assembly in this way, it is possible to promote the transfer of heat, thereby raising the allowable power level of the core.

The above-described art relates to a PWR. If the spacer structure is used in a boiling water reactor (BWR), it is impossible to achieve the above-mentioned object. In such cases, a void occurs in the core of the BWR, and the coolant flows in a two-phase flow in the region downstream of the position where the void is present.

FIGS. 11 and 12 show the manner in which a coolant flows in a two-phase flow region during its flow through the space surrounded by fuel rods in a conventional structure. In the two-phase flow region, the liquid phase flows while either adhering as liquid films to the surfaces of fuel rods 1 or existing as liquid drops in the vapor. On the other hand, the vapor contains the liquid drops, and flows in the space surrounded by the fuel rods 1. If the above-described conventional fuel spacer is used in the two-phase flow region, the coolant forms a flow which proceeds along the peripheries of the fuel rods 1. Such a flow can, under centrifugal force, act to strip off the liquid films adhered to the fuel rods 1, thereby decreasing the amount of liquid adhered to the fuel rods 1 in the form of liquid films. As a result, there is a risk that parts of the fuel rods 1 may be deprived of liquid, thereby causing their dry-out. This leads to a drop in the output that brings the coolant to a boil, in other words, a drop in the critical output.

The conventional spacer structure entails another problem. Because an obstacle is provided, this inevitably increases the degree of pressure loss in both single-phase and two-phase flows. This means that the allowable power level of the core is lowered correspondingly.

It is considered that, in a region where the coolant forms a two-phase flow, or a gaseous-and-liquid phase flow, due to the formation of a void in the core of a BWR, if it is possible to increase the amount of liquid-film-forming flow which flows while adhering to the fuel rods, it is then possible to promote heat transfer and raise the allowable power level of the core.

On the basis of this theory, proposals to overcome the above-described problems have been made, for instance, in Japanese Patent Unexamined Publications Nos. 61-90085 and 1-132990. Among these, the publication No. 1-132990 shows a fuel assembly including fuel rods, and a grating-type fuel spacer with spiral members provided at individual intersections of the grating, the spiral members supporting the fuel rods. In this fuel assembly, the spiral members are positioned while surrounded by adjacent fuel rods, and guide cooling water flowing through the inter-rod spaces toward the fuel rods. With this structure, however, since the flow of the cooling water, which is made spiral by the spiral members, abuts directly on the fuel rods within the fuel spacer, there is a risk that the directly abutting flow may strip off the liquid films flowing on the fuel rods. If such is the case, a reduced amount of liquid adheres, in the form of films, to the fuel rods at downstream positions of the fuel spacer.

The above-described risk is eliminated in Japanese Patent Unexamined Publication 61-90085 where a spiral flow is generated in the space between cylindrical cells. This publication shows a fuel spacer formed by assembling together a multiplicity of cylindrical cells allowing the insertion therein of fuel rods. The spacer is provided with guide portions for guiding the flow of cooling water in the direction of the fuel rods. The guide portions are formed in the side surfaces of the cylindrical cells defining spaces which are each surrounded by adjacent cylindrical cells and through which cooling water flows.

This conventional structure is, however, not completely free from problems. Since guide grooves constituting the guide portions are formed from the lower ends to the upper ends of the individual cells, the level of pressure loss is still high. Furthermore, because these oblique guide grooves cannot be formed with ease, and because it is impossible to form in one process the guide grooves as well as upper- and lower-spring portions for holding the fuel rods in their predetermined positions, the formation of the guide grooves inevitably leads to an increase in production cost. Another problem is that since a part of each cylinder is bent at a sharp angle to form a guide groove, this part fails to exhibit sufficient strength.

SUMMARY OF THE INVENTION

It is an object of the present invention to provide a fuel spacer which, while assuring a sufficient strength for performing the fundamental function of a fuel spacer that is to maintain fuel rods in their correct position, is also capable of promoting heat transfer from the fuel rods serving as the heat source to the coolant so as to raise the allowable power level of the fuel assembly, and capable of lowering the void ratio so as to increase the reactivity. The present invention is also directed to the provision of a fuel assembly provided with such a fuel spacer.

In order to achieve the above-stated objects, the present invention provides a fuel assembly having fuel rods inserted into regularly arranged cells of a spacer which keeps the fuel rods correctly spaced from one another, the fuel spacer having spacer elements disposed in a plurality of stages in the longitudinal direction of the fuel rods, the fuel assembly comprising: vanes formed on the cells in such a manner that each vane is bent from a cut formed in a part of the side wall of the cell, the vanes obliquely projecting into the corresponding spaces between adjacent fuel rods and allowing a coolant flowing through the spaces and forming two-phase flows to generate whirling flows toward the fuel rods. This aspect of the present invention also provides a fuel spacer used in such a fuel assembly.

Each of the vanes may be formed either at a position intermediate in the longitudinal direction of the side wall of the spacer cell or at a position starting from the longitudinal upper end of the side wall of the cell.

Another aspect of the present invention provides a fuel spacer including thin-walled cylinders extending in the longitudinal direction of the fuel rods and being fixed to the cells at positions within the spaces between adjacent fuel rods, each of the cylinders having vanes provided therein, said vanes obliquely projecting inward of the cylinders and allowing a coolant flowing through the spaces and forming two-phase flows to generate swirling flows toward the fuel rods. This aspect of the present invention also provides a fuel assembly having such a fuel spacer.

Still another aspect of the present invention provides a fuel spacer including spiral vanes fixed to the cells at positions within the spaces between adjacent fuel rods, the vanes allowing a coolant flowing through the spaces and forming two-phase flows to generate swirling flows toward the fuel rods. This aspect of the present invention also provides a fuel assembly having such a fuel spacer.

In brief, the present invention provides a fuel assembly provided with one of the above-specified fuel spacers, the spacer being provided at least at the uppermost stage in the longitudinal direction of the fuel rods. In any of the constructions, the vanes may be provided in the spaces between adjacent fuel rods that are, within the plane defined by each spacer element, the closest spaces to the outer periphery of the plane and the spaces second to the closest spaces.

The above-described structures may adopt either of the following arrangements. In one arrangement, an ordinary fuel spacer element having no vane is disposed at a lower stage on the fuel rods, while a fuel spacer element having vanes is disposed at an upper stage on the fuel rods. In another arrangement, an ordinary fuel spacer element having no vane is disposed at a lower stage on the fuel rods, a fuel spacer element having vanes on the side walls of the cells is disposed at an intermediate stage on the fuel rods, and a fuel spacer element having vanes as members fixed to the cells is disposed at an upper stage on the fuel rods.

In the two-phase flow region in a fuel assembly for use in a BWR, to generate swirls in the spaces between adjacent fuel rods, hence, to make the flow of a coolant turbulent, is believed to result in a higher efficiency in the transfer of heat from the fuel rods to the coolant, than to simply guide, as in the prior art, the flow of a coolant toward the fuel rods.

As shown in FIG. 13, when a swirl is generated in a space surrounded by a plurality of fuel rods 1, the centrifugal force of the swirl causes liquid drops contained in the vapor to adhere to the liquid films flowing along the fuel rods. Therefore, the fuel rods will have a greater amount of coolant flowing thereon than the conventionally-achieved amount of liquid films, thereby achieving a corresponding increase in the allowable power level of the fuel rods, hence, in the critical output.

When liquid drops in the vapor are carried by the centrifugal force of the swirl to the surfaces of the fuel rods, this leads to another phenomenon, a corresponding decrease in the amount of liquid drops remaining in the vapor. Therefore, the resultant state of flow is such that it approximates a separate flow where the liquid phase flows along the fuel rods while the vapor flows through the center of the flow passage.

When a separate flow is formed by the coolant, since the vapor need not contain a great amount of liquid drops as it flows, the vapor does not require so much kinetic energy as to move along with liquid drops downstream. The marginal energy leads to a corresponding increase in the speed of the vapor, resulting in an increased difference in speed between the vapor and the liquid phase.

FIG. 14 is a graph showing how the void ratio, i.e., the proportion of the gaseous phase in the sectional area of the flow passage, changes as the difference in speed between the vapor and the liquid phase increases.

In this graph, the axis of abscissa represents the slip ratio (vapor speed/liquid phase speed) which is defined as the ratio between the speed of the vapor and that of the liquid phase. A large slip ratio means a great difference in speed between the vapor and the liquid phase.

It will be understood from FIG. 14 that as the slip ratio increases, the void ratio decreases. In other words, at this time, the proportion of the vapor in the sectional area of the flow passage decreases, to cause a relative increase in the density of the moderator in the sectional area.

According to the present invention, therefore, increased density of the moderator makes it possible to achieve increased reactivity. This is advantageous in terms of fuel economy. Further, the critical output can be enhanced.

BRIEF DESCRIPTION OF THE DRAWINGS

FIG. 9 is a view showing the overall structure of an embodiment of a fuel assembly according to the present invention;

FIG. 10 is a view showing a fuel rod in the fuel assembly shown in FIG. 9;

DESCRIPTION OF THE PREFERRED EMBODIMENTS

Figure 1:
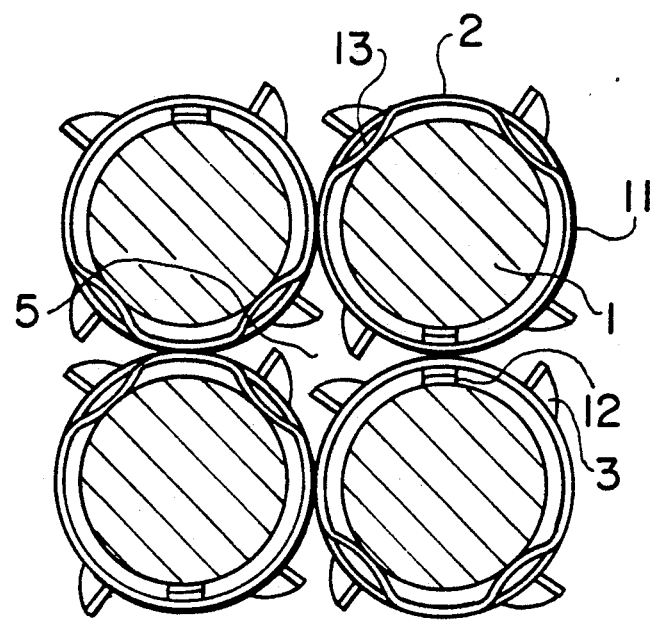
FIG. 1 is a plan view of essential parts of an embodiment of a fuel spacer according to the present invention, which spacer may be used in a fuel assembly, shown in FIG. 9.

The preferred embodiments of the present invention will now be described with reference to FIGS. 1 to 10.

As shown in FIGS. 9 and 10, in a fuel assembly for use in a BWR according to present invention, a plurality of fuel rods 1, each consisting of fuel pellets 22 charged into a cell 21 having end plugs 23 welded onto the upper and lower ends thereof, are arranged in arrays, for instance, in eight rows and eight columns, in a channel box 7, with the upper and lower ends of the fuel rods 1 being fixed by tie-plates 8 and 9. A handle 10 is mounted on an upper portion of the assembly. In order to keep the thin, elongated fuel rods 1 correctly spaced from one another, spacer elements of a fuel spacer 2 are disposed in several stages which are vertically separated.

Figure 2:
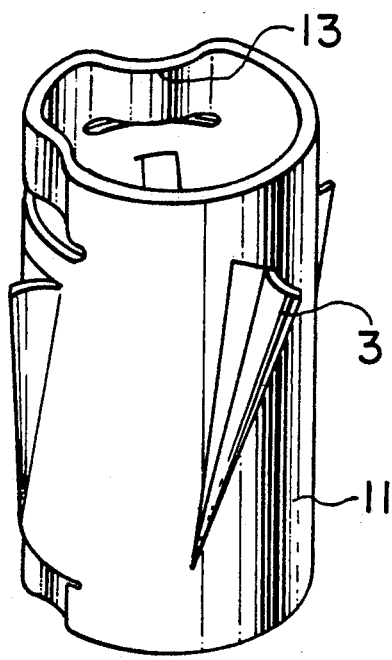
FIG. 2 is a perspective view of a cylindrical cell of the fuel spacer shown in FIG. 1.
Figure 7:
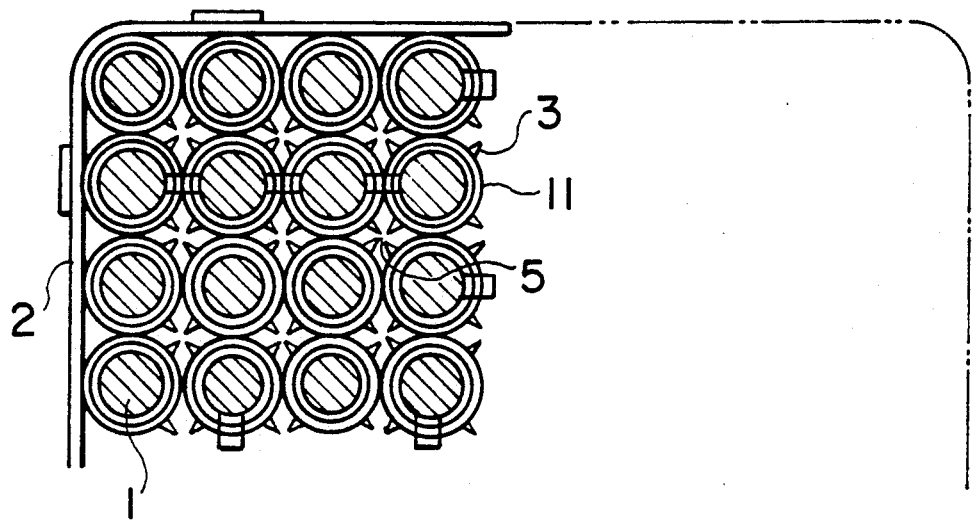
FIG. 7 is a sectional view taken along the line VII—VII shown in FIG. 9.

As shown in FIG. 7, a round-cell-type fuel spacer 2 has a plurality of cylindrical cells 11 arranged in a grating-like manner. Adjacent cylindrical cells 11 are joined together by welding. As shown in FIG. 1, a fuel rod 1 inserted into a cylindrical cell 11 is supported by two projections 13 and a loop-shaped spring 12, which are provided within the cell 11. The cylindrical cell 11 has vanes 3 for generating swirls, as shown in FIGS. 1 and 2. Each vane 3 is formed by forming a cut in a part of the side wall of the cell 11 so as to separate a portion of the side wall from the cut, and bending the separated portion. The vane 3 thus formed is bent from the cut and projects obliquely outward. As shown in FIG. 7, the vanes 3 are disposed while projecting into the corresponding inter-rod space 5 surrounded by adjacent cylindrical cells 11, the space being substantially rhombic. The number of vanes 3 provided on one cell 11 varies in accordance with the position of the cell 11 in the cell matrix. As shown in FIG. 7, the corner cells each have one (the smallest number) vane, while the cells in inward arrays each have four (the greatest number) vanes.

In the spacer 2 having the above-described construction, the vanes 3 cause the generation of swirls of coolant in the spaces between the fuel rods 1, which in turn causes an increased mount of liquid drops to adhere to the fuel rods 1, thereby increasing the thickness of the liquid films on the fuel rods 1. As a result, the transfer of heat from the fuel rods 1 to the liquid films formed by the coolant is promoted. This enables an increase in the critical output, hence, in the allowable power level.

The cuts for forming the vanes 3 can be easily formed simultaneously with the formation of the spring portions for holding the fuel rods 1 in place, which are formed by embossing. The formation of the vanes 3, therefore, does not involve the drawback of the prior art where the formation of an oblique groove extending from a lower position to an upper position of the cell is difficult and necessitates an additional process. Another advantage is that, in contrast with the prior art where a guide groove is formed by bending at a sharp angle a portion of the cell cylinder which extends from a lower position to an upper position thereof, a vane 3 is formed by cutting a relatively small part of the side wall of the cell; this assures sufficient strength in the side wall. Furthermore, the degree of pressure loss in the spaces 5 between the fuel rods 1 is low. Still further, the flow of a liquid film between a cell and the fuel rod, that is, the endo-cell flow of liquid film, can be substantially free from disturbance.

Although in the embodiment shown in FIG. 2, each vane 3 is formed by cutting an inverted-L-shaped slit in the associated side wall of the cell, the cut will not necessarily have this shape so long as the vanes 3 have tip portions which obliquely project into the corresponding spaces 5 between the fuel rods 1. For instance, each vane may be formed by cutting, for instance, a U-shaped slit.

Figure 3:
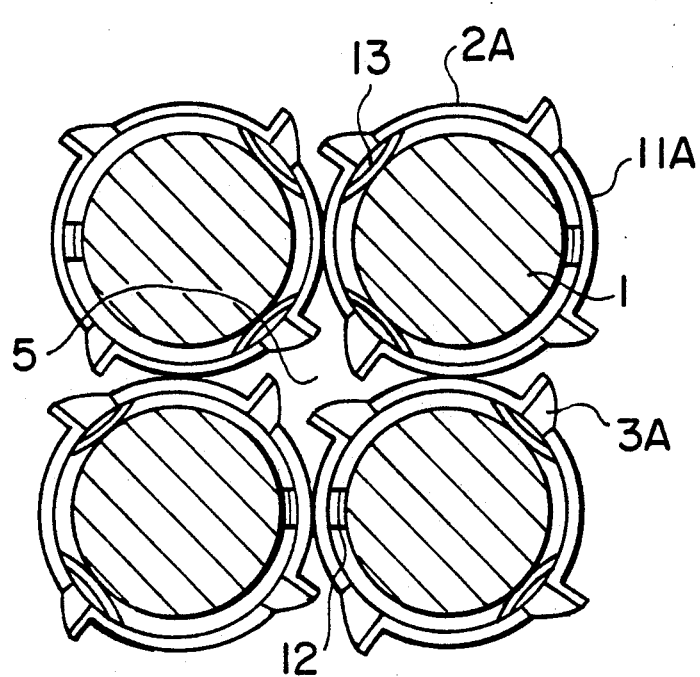
FIG. 3 is a plan view of essential parts of another embodiment of a fuel spacer according to the present invention.
Figure 4:
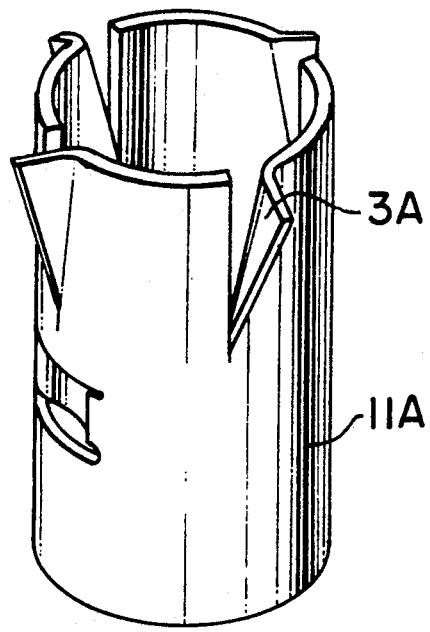
FIG. 4 is a perspective view of a cylindrical cell of the fuel spacer shown in FIG. 3.

FIGS. 3 and 4 show another embodiment of the fuel spacer according to the present invention. A fuel spacer 2A according to this embodiment has cylindrical cells 11A receiving fuel rods 1. Each cell 11A has vanes 3A which are each formed by cutting a vertically extending slit from the upper end of the cell, and bending the separated portion of the side wall of the cell 11A in such a manner that it projects outward.

If this construction is adopted, it is possible, similarly to the case of the fuel spacer 2, to promote the transfer of heat from the fuel rods to liquid films, thereby raising the allowable power level of the fuel rods 1. Another advantage is that the process of forming the vanes 3A is simpler than that required in the embodiment shown in FIGS. 1 and 2.

When a fuel spacer of the same type as the above-described fuel spacer 2 or 2A having vanes of the same type as the vanes 3 or 3A is used in a fuel assembly, the amount of liquid drops flowing in the vapor through the inter-rod spaces 5 decreases in effect as the coolant flows toward the upper ends of the fuel rods 1. This means that the increment in the pressure loss, which the provision of the vanes 3 or 3A entails, rapidly decreases toward the upper ends, till the vicinity of the upper ends of the fuel rods 1 is substantially free from such an increment in the pressure loss. Conversely, in this area, it is of more importance that stronger swirls be generated so as to secure a sufficient amount of liquid films.

Figure 5:
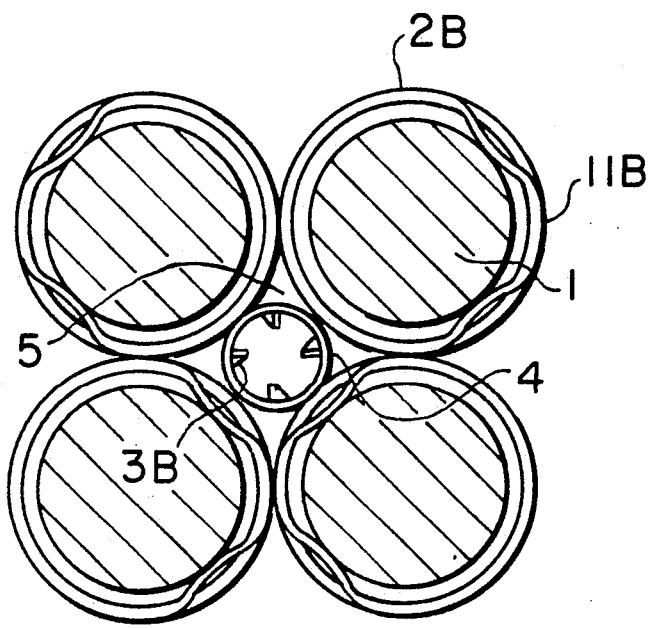
FIG. 5 is a plan view of essential parts of a further embodiment of a fuel spacer according to the present invention.
Figure 6:
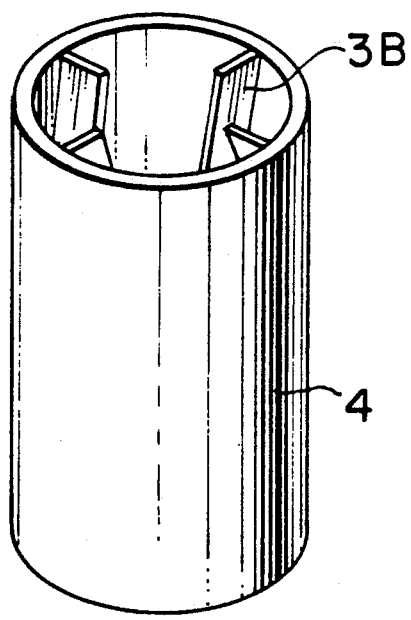
FIG. 6 is a perspective view of a thin-walled cylinder used in the spacer shown in FIG. 5.

A fuel assembly capable of meeting this requirement will be described as another embodiment. A fuel assembly of this embodiment has a fuel spacer 2B, of which essential parts are shown in FIG. 5. The fuel spacer 2B has cylinders 4, each being shown in FIG. 6. Specifically, in order to provide vanes, none of the cylindrical cells 11B of the spacers 2B are subjected to direct machining, but thin-walled cylinders 4, each having vanes 3B provided therein, are disposed in the spaces 5 between fuel rods 1 while being fixed to adjacent cylindrical cells 11B.

According to this embodiment, since, similarly to the foregoing embodiments, swirls are generated in the cylinders 4, the transfer of heat from the fuel rods 1 to the liquid films is promoted, and the allowable power level of the fuel rods 1 is thus raised. Another advantage is that since the vanes 3B are provided within the cylinders 4, it is possible to design the dimensions and the configuration of the vanes more freely than the foregoing embodiments where portions of the side walls of the cylindrical cells are formed as vanes, and to secure the generation of stronger swirls. The section of the cylinders 4 are not necessarily circular; so long as the degree of pressure loss is as low as possible and the cylinders can be sufficiently firmly fixed to the side walls of the cylindrical cells 11B, the section of the cylinders may be angular.

Figure 8:
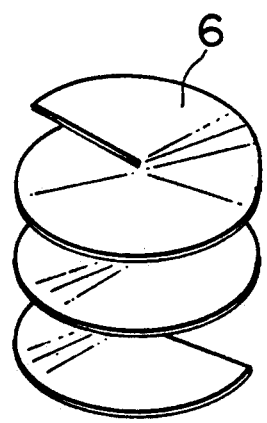
FIG. 8 is a perspective view of a spiral vane as a substitute for the thin-walled cylinder used in the spacer shown in FIG. 5.
Figure 11:
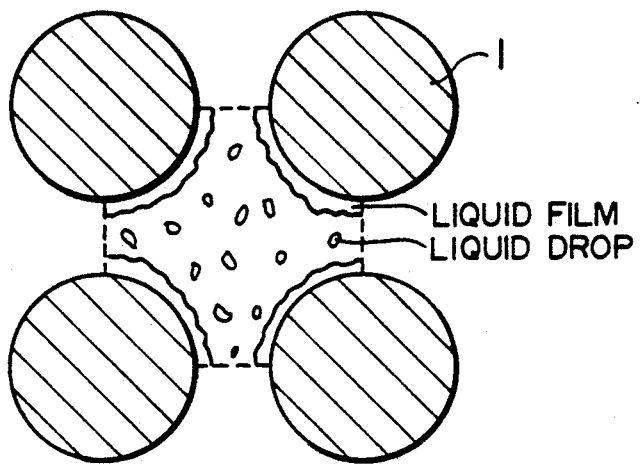
FIGS. 11 and 12 are views showing the manner in which a coolant flows in a two-phase region in the space between fuel rods in a conventional structure.
Figure 12:
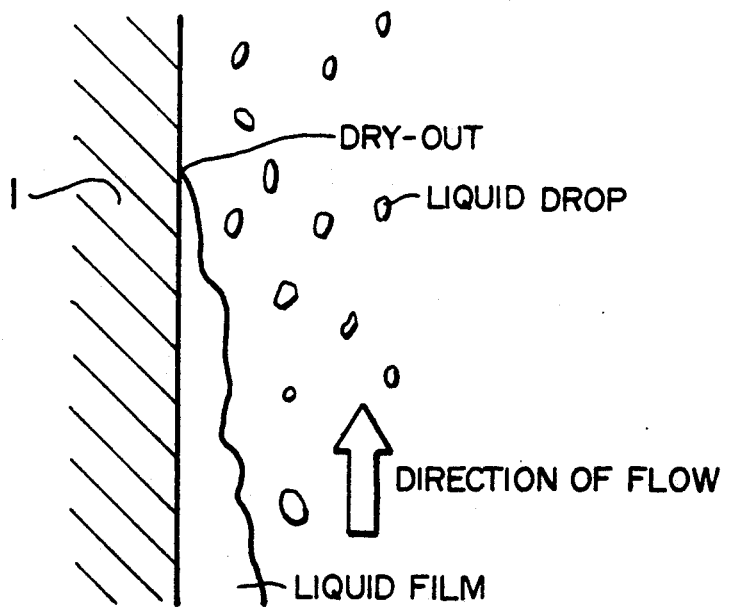
Figure 13:
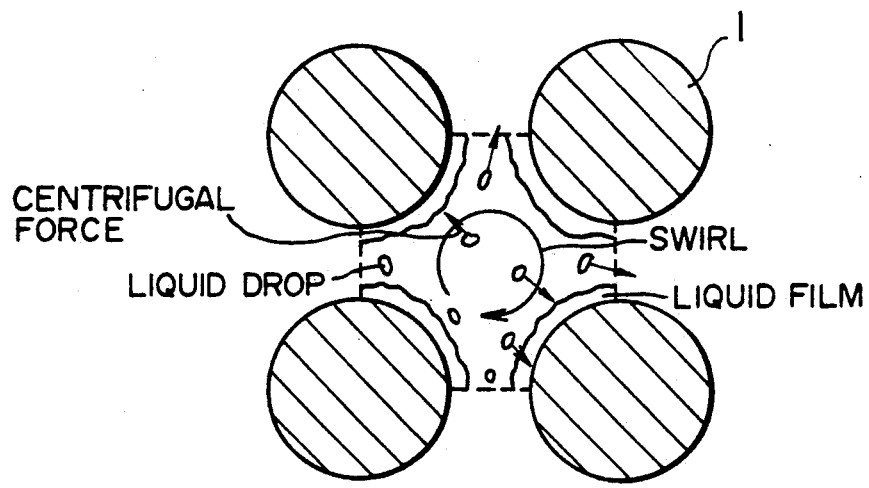
FIG. 13 is a view showing the manner in which a coolant flows when a swirl is generated in the space between fuel rods.
Figure 14:
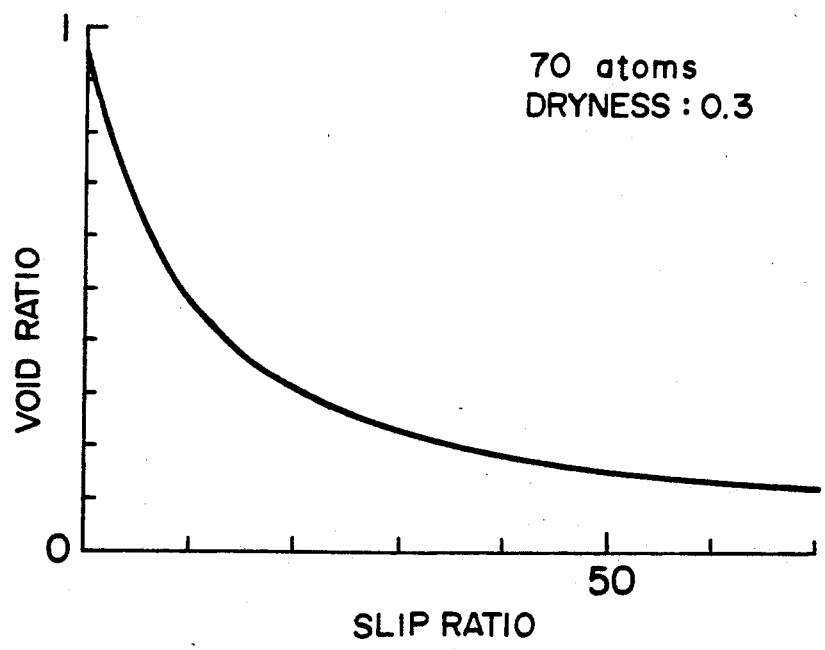
FIG. 14 is a graph showing the relationship between the slip ratio and the void ratio.

In order to generate still stronger swirls in the vicinity of the upper ends of the fuel rods 1, it is possible to arrange a fuel spacer of a different type in the vicinity of the upper ends of the fuel rods 1, the fuel spacer having spiral vanes 6, each being shown in FIG. 8, instead of the cylinders 4 shown in FIG. 5.

When the merit of swirls generated by vanes is balanced against the increment in the degree of pressure loss entailed by the provision of the vanes, it is understood that the vanes may not necessarily be of one type throughout various areas arranged longitudinally of the fuel rods 1.

Specifically, it is preferable to dispose an ordinary fuel spacer element having no vanes at a lower stage on the fuel rods where the pressure loss is a factor of importance requiring consideration, while a fuel spacer element having vanes is disposed at an upper stage on the fuel rods where the generation of swirls is a more important factor.

It is also possible to dispose an ordinary fuel spacer element having no vanes at a lower stage on the fuel rods, while a vaned fuel spacer element of the type 2 or 2A is disposed at an intermediate stage on the fuel rods, and a vaned fuel spacer element which is either of the type 2B or of the type provided with the spiral vanes (shown in FIG. 8) is disposed at an upper stage of the fuel rods.

Within the section of the fuel spacer shown in FIG. 7, the fuel rods in the arrays closest to the outer periphery of the fuel spacer as well as those in the arrays second to the closest are exposed to a thermally severe condition when compared to others. Therefore, vanes may be disposed only in the spaces surrounded by the fuel rods in these arrays.

According to the present invention, vanes disposed in the spaces between the fuel rods generate swirls. Therefore, the transfer of heat from the fuel rods serving as the heat source to the coolant is promoted, thereby raising the allowable power level of the fuel assembly. Also, the void ratio is lowered, thereby increasing the reactivity.

The fuel spacer according to the present invention, which achieves these advantages, is such that either vanes are formed by simply bending portions of the side walls of the cells of the spacer, or the spacer itself is not subjected to any direct machining and separate members, i.e., cylinders having built-in vanes or spiral vanes, are fixed to the spacer. Therefore, in contrast with the prior art where guide grooves are obliquely formed from lower positions to upper positions of the cells of the spacer, it is possible to assure a sufficient strength for performing the fundamental function of a fuel spacer which is to maintain fuel rods in their correct position.

In the type where vanes are formed by directly subjecting the spacer cells to machining, vanes are formed simultaneously with the embossing of the spacer cells and by cutting parts of the side walls of the spacer cells and bending portions of the side walls from the cuts. Therefore, the manufacture of the spacer remains simple.

WHAT IS CLAIMED IS:
1. A fuel assembly having fuel rods inserted into hollow cylindrical cells welded to one another in a grating arrangement so as to form a spacer which keeps the fuel rods correctly spaced from one another, the spacer having spacer elements disposed in a plurality of stages in the longitudinal direction of the fuel rods, said fuel assembly comprising:
vanes formed on said cells at least at positions corresponding to the uppermost of said stages of said spacer elements, each vane being bent from a cut formed in a part of the side wall of the cell, said vanes obliquely projecting into the corresponding spaced between adjacent fuel rods and allowing a coolant flowing through said spaces and forming two-phase flows to generate swirling flows toward said fuel rods and enabling adherence of a liquid film on said fuel rods.

2. A fuel assembly according to claim 1, wherein each of said vanes is formed at a position intermediate in the longitudinal direction of the side wall of the cell of said fuel spacer.

3. A fuel assembly according to claim 1, wherein each of said vanes is formed at a position starting from the longitudinal upper end of the side wall of the cell of said fuel spacer.

4. A fuel assembly having fuel rods inserted into hollow cylindrical cells welded to one another in a grating arrangement so as to form a spacer which keeps the fuel rods correctly spaced from one another, the spacer having spacer elements disposed in a plurality of stages in the longitudinal direction of the fuel rods, said fuel assembly, comprising:
thin-walled cylinders extending in the longitudinal direction of said fuel rods and being fixed to said cells at least at positions within the spaces between adjacent fuel rods which correspond to the uppermost of said stages of said spacer elements, each of said cylinders having vanes provided therein, said vanes obliquely projecting inward of said cylinders and allowing a coolant flowing through said spaces and forming two-phase flows to generate swirling flows toward said fuel rods and enabling adherence of a liquid film on said fuel rods.

5. A fuel assembly having fuel rods inserted into hollow cylindrical cells welded to one another in a grating arrangement so as to form a spacer which keeps the fuel rods correctly spaced from one another, the spacer having spacer elements disposed in a plurality of stages in the longitudinal direction of the fuel rods, said fuel assembly comprising:
spiral vanes fixed to said cells at least at positions within the spaces between adjacent fuel rods which correspond to the uppermost of said spacer elements, said vanes allowing a coolent flowing through said spaces and forming two-phase flows to generate swirling flows toward said fuel rods and enabling adherence of a liquid film on said fuel rods.

6. A fuel assembly according to any of claims 1 to 5, wherein the vanes are provided in the spaces between adjacent fuel rods that are, within the plane defined by each spacer element, the spaces closest to the outer periphery of the plane and the spaces second to the closest spaces.

7. A fuel assembly according to any of claims 1 - 6, further comprising an ordinary fuel spacer element having no vanes and being disposed at a lower stage on said fuel rods, wherein a fuel spacer element having vanes of the type described in any of the claims is disposed at an upper stage on said fuel rods.

8. A fuel assembly having fuel rods inserted into hollow cylindrical cells welded to one another in a grating arrangement so as to form a spacer which keeps the fuel rods correctly spaced from one another, the spacer rods having spacer elements disposed in a plurality of stages in the longitudinal direction of the fuel rods, said fuel assembly comprising:
an ordinary fuel spacer element having no vanes and being disposed at a lower stage on said fuel rods;

a fuel spacer element having vanes of the type described in any of the claims 1 to 3 and being disposed at an intermediate state on said fuel rods; and a fuel spacer element having vanes of the type described in claim 4 or 5 and being disposed at an upper state on said fuel rods.

9. A fuel spacer for keeping fuel rods correctly spaced from one another, the spacer comprising a plurality of hollow cylindrical cells welded to one another in a grating arrangement into which the fuel rods are inserted, said fuel; spacer comprising:

vanes formed on said cells, each vane being bent from a cut formed in a part of the side wall of the cell, said vanes obliquely projecting into the corresponding spaces between adjacent fuel rods and allowing a coolant flowing through said spaces and forming two-phase flows to generate swirling flows toward said fuel rods and enabling adherence of a liquid film on said fuel rods.

10. A fuel spacer according to claim 9, wherein each of said vanes is formed at a position intermediate in the longitudinal direction of the side wall of the cell.

11. A fuel spacer according to claim 9, wherein each of said vanes is formed at a position starting from the longitudinal upper end of the side wall of the cell.

12. A fuel spacer for keeping fuel rods correctly spaced from one another, the spacer comprising a plurality of hollow cylindrical cells welded to one another in a grating arrangement into which the fuel rods are inserted, said fuel spacer comprising:

thin-walled cylinders extending in the longitudinal direction of said fuel rods and being fixed to said cells at positions within the spaces between adjacent fuel rods, each of said cylinders having vanes provided therein, said vanes obliquely projecting inward of said cylinders and allowing a coolant flowing through said spaces and forming two-phase flows to generate swirling flows toward said fuel rods and enabling adherence of a liquid film on said fuel rods.

13. A fuel spacer for keeping fuel rods correctly spaced from one another, the spacer comprising a plurality of hollow cylindrical cells welded to one another in a grating arrangement into which the fuel rods are inserted, and spacer elements disposed in a plurality of stages in the longitudinal direction of the fuel rods, said fuel spacer comprising:

spiral vanes fixed to said cells at positions within the spaces between adjacent fuel rods, said vanes allowing a coolant flowing through said spaces and forming two-phase flows to generate swirling flows toward said fuel rods and enabling adherence of a liquid film on said fuel rods.

* * * * *